(12) United States Patent
Ma

(10) Patent No.: US 6,906,555 B2
(45) Date of Patent: Jun. 14, 2005

(54) PREVENTION OF METASTABILITY IN BISTABLE CIRCUITS

(76) Inventor: James Ma, 2002 Forgetree Ct., San Jose, CA (US) 95131

( * ) Notice: Subject to any disclaimer, the term of this patent is extended or adjusted under 35 U.S.C. 154(b) by 36 days.

(21) Appl. No.: 10/458,878

(22) Filed: Jun. 10, 2003

(65) Prior Publication Data

US 2004/0251944 A1 Dec. 16, 2004

(51) Int. Cl.[7] ............................................. H03K 19/00
(52) U.S. Cl. ......................... 326/94; 327/155; 375/357
(58) Field of Search ........................... 326/94; 327/155, 327/218; 370/298; 710/58; 375/354, 355, 357

(56) References Cited

U.S. PATENT DOCUMENTS

| | | | |
|---|---|---|---|
| 4,799,023 A | | 1/1989 | Firooz et al. |
| 4,929,850 A | | 5/1990 | Breuninger |
| 4,963,772 A | | 10/1990 | Dike |
| 4,999,528 A | | 3/1991 | Keech |
| 5,020,038 A | | 5/1991 | Swapp et al. |
| 5,036,221 A | * | 7/1991 | Brucculeri et al. ........... 326/94 |
| 5,471,159 A | | 11/1995 | Stuebing et al. |
| 5,548,620 A | | 8/1996 | Rogers |
| 5,602,878 A | | 2/1997 | Cross |
| 5,754,070 A | | 5/1998 | Baumann et al. |
| 5,793,227 A | | 8/1998 | Goldrian |
| 5,867,695 A | | 2/1999 | Amini et al. |
| 5,999,029 A | * | 12/1999 | Nguyen et al. ............. 327/198 |
| 6,055,285 A | | 4/2000 | Alston |
| 6,072,346 A | | 6/2000 | Ghahremani |
| 6,247,137 B1 | | 6/2001 | Wickeraad |
| 6,531,905 B1 | | 3/2003 | Wang |

OTHER PUBLICATIONS

ICT paper entitled "PEEL™ Device Metastability"; date unknown but known to be before Jun. 10, 2003; 3 pp.
Semiat, et al., "Timing Measurements of Synchronization Circuits," VLSI Systems Research Center, Technion—Israel Institute of Technology, Haifa, Israel; May 2003; 10 pp.
Varma, et al., "Metastability Reduction by Aperture Transformation," IBM India Research Laboratory, Centre for Applied Research Electronics, New Delhi, India; date unknown but known to be before Jun. 10, 2003; 10pp.

* cited by examiner

Primary Examiner—Daniel D. Chang
(74) Attorney, Agent, or Firm—Fish & Richardson P.C.

(57) ABSTRACT

Methods and apparatus implementing techniques for prevention of metastability in a bistable circuit. The techniques include detecting a change in a data signal, sampling the detected change in reference to a sampling window of a clock signal input of a bistable circuit to determine if the detected change occurs within the sampling window, and selecting a stable data input to present to an input of the bistable circuit based on whether the detected change occurs within the sampling window. The sampling window represents a time period during which a change in the data signal can cause metastability in a bistable circuit.

24 Claims, 5 Drawing Sheets

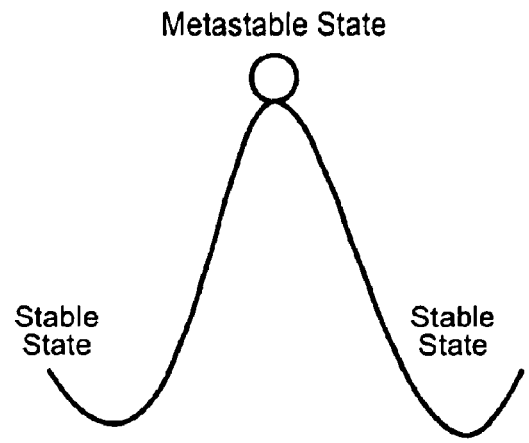
FIG._1
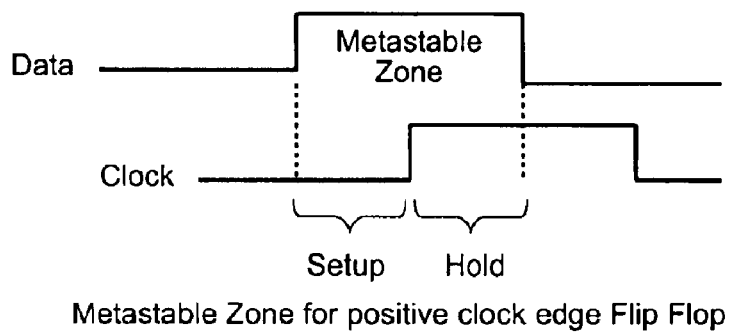
Metastable Zone for positive clock edge Flip Flop
FIG._2
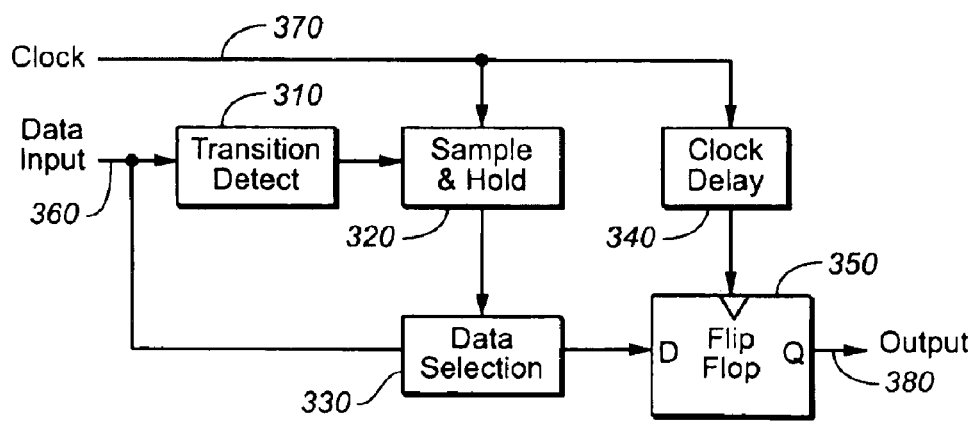
FIG._3

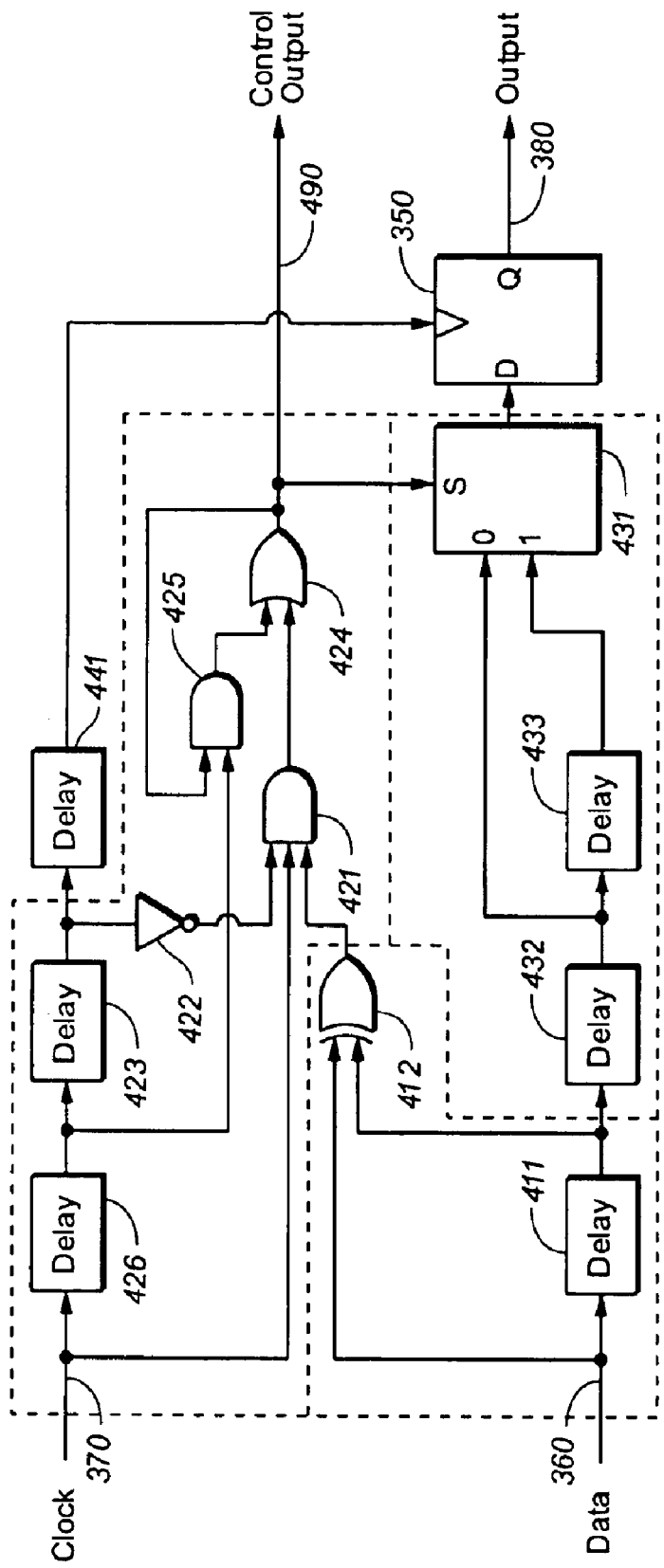
FIG._4

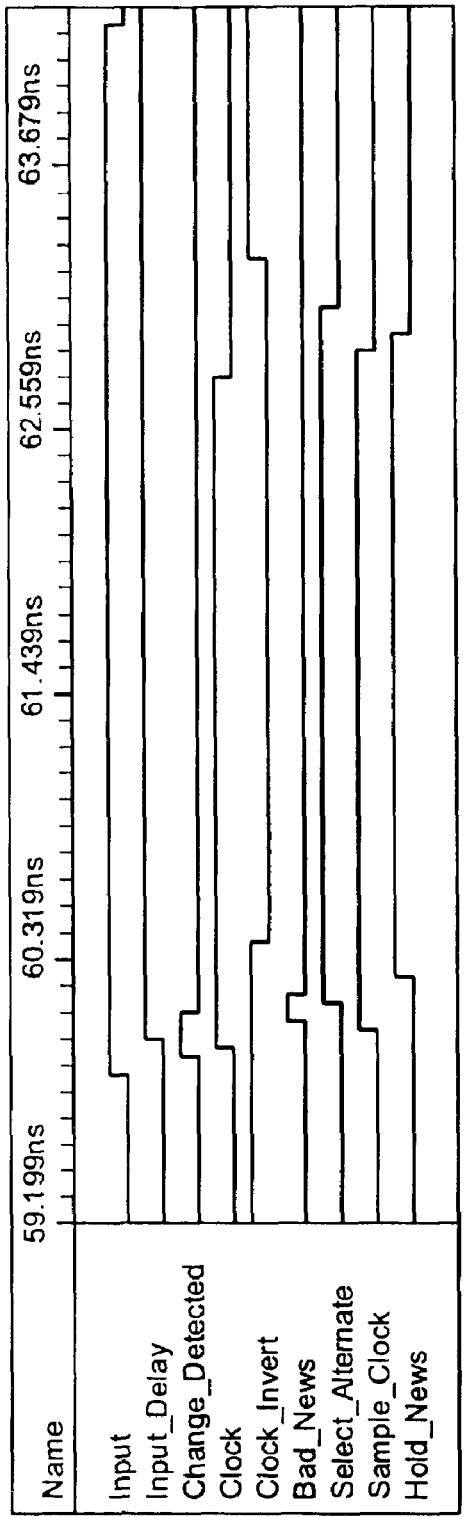
FIG._5
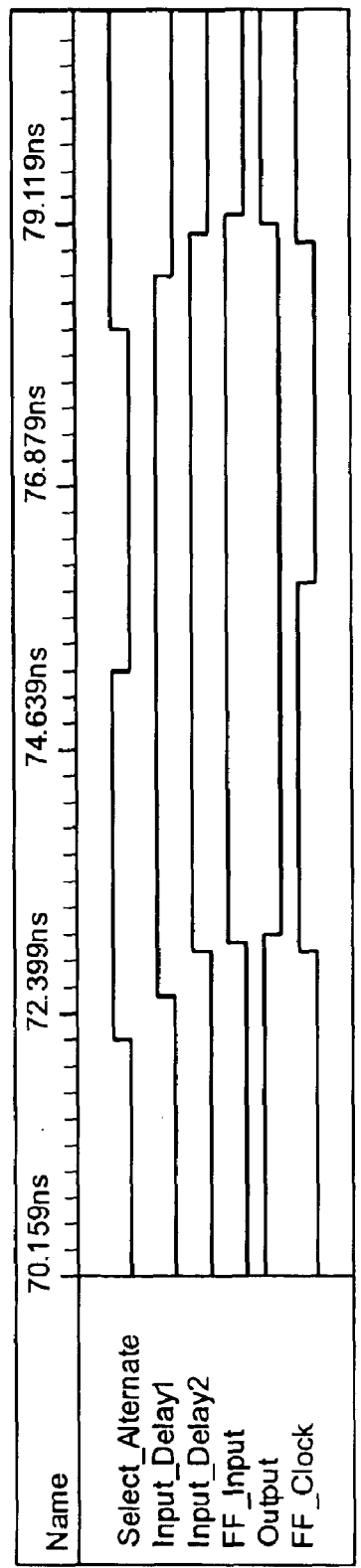
FIG._6

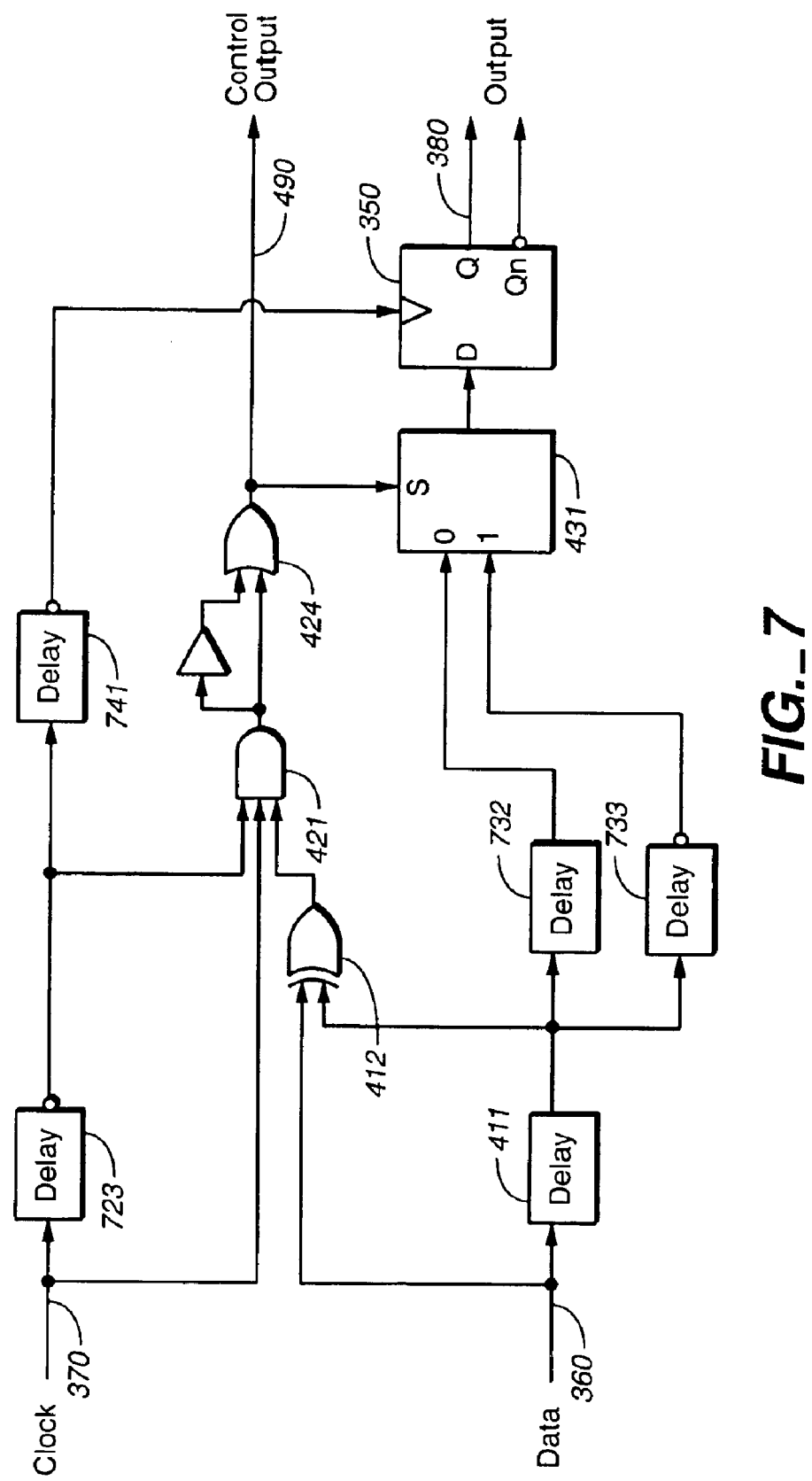
FIG._7

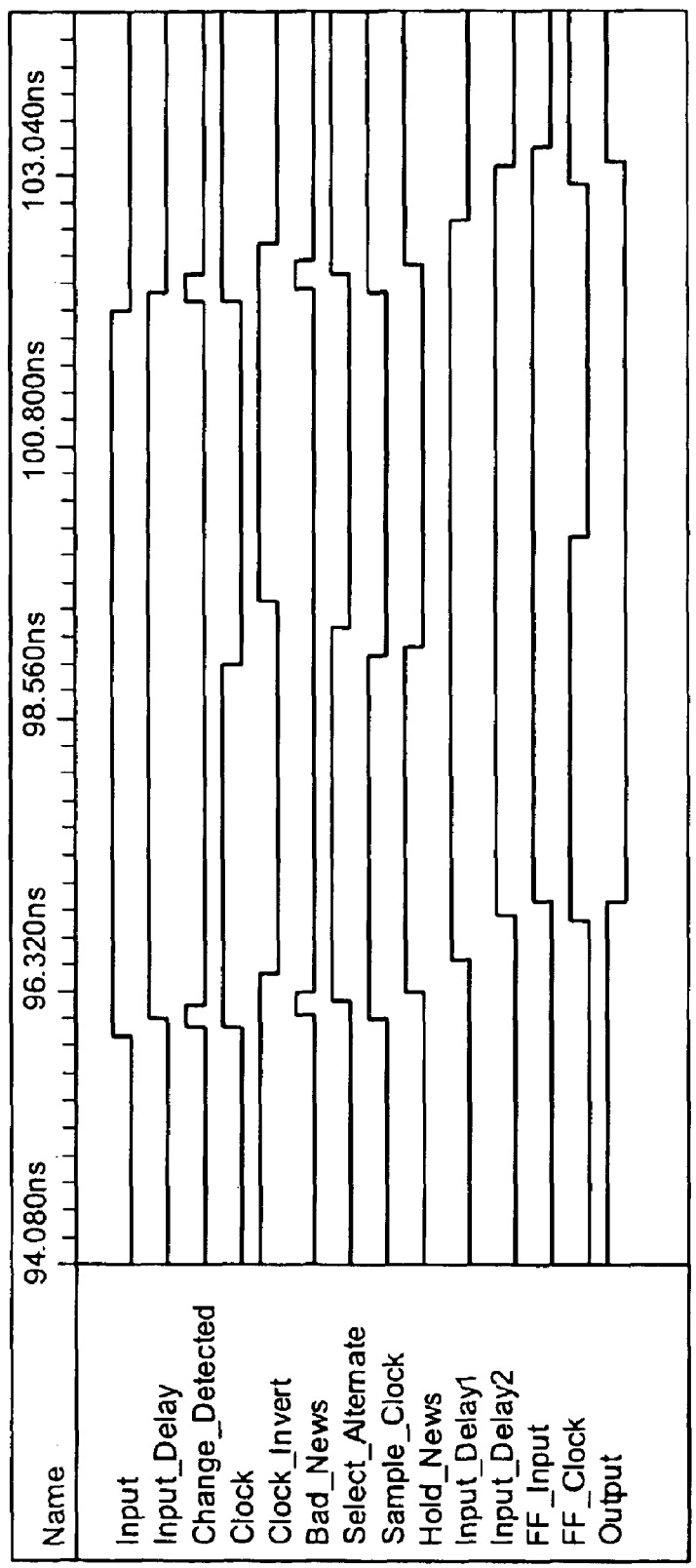
FIG._8

PREVENTION OF METASTABILITY IN BISTABLE CIRCUITS

TECHNICAL FIELD

This invention relates to a circuit and method for preventing metastability in bistable digital circuits.

BACKGROUND

A bistable digital circuit, such as a flip flop, stores data by using two stable equilibrium states to represent 1 and 0. All bistable circuits have a metastable equilibrium state in between the two stable states. This metastable state is encountered during the transition from one stable state to the other stable state. FIG. 1 is a graphical representation of the transition from one stable state to another stable state through a metastable state. Although it is theoretically possible for a circuit to stay in this metastable state indefinitely, in practice, the duration of the metastable state is short. The existence of this metastable equilibrium state means the conceptually binary flip flop may actually be in a third undefined state for an indefinite amount of time. This ambiguity can lead to random failures in digital systems where only 1s and 0s are expected.

Over 35 years ago, random mysterious failures in early digital electronic systems led to the discovery of metastable behavior in flip flops and the conditions under which metastable behavior are exhibited. Metastability often occurs when flip flops have asynchronous inputs and the asynchronous inputs violate the setup and hold conditions of the flip flops. For example, a common type of flip flop is the D flip flop. One variation of this flip flop has a data input, a clock input and a data output. On the rising edge of the clock input, the data input is sampled and stored in the flip flop. The data output changes after a delay to reflect the stored data. However, for the D flip flop to function as described, the data input must be stable for some period of time before the rising clock edge appears, and remain stable for some period of time after the rising clock edge passes. The period of time before the appearance of the rising clock edge is called the setup time. The period of time after the rising clock edge passes is called the hold time. FIG. 2 illustrates the D flip flop setup and hold times. If the data input is not stable during the setup and hold time, a condition known as a setup and hold violation, the flip flop may go into a metastable state and the data output will not be a 1 or a 0 as desired.

An asynchronous input signal is a signal which may arrive at any moment. The signal has no defined time relationship relative to the clock of the receiving flip flop. Asynchronous signals commonly occur in systems with multiple clocks. A signal may be generated in one clock domain and be transmitted to another clock domain. If the source clock and the destination clock have no fixed relationship, then the signal will arrive randomly from the perspective of the destination clock domain. Given this random arrival, the asynchronous signal will frequently not be stable during the setup and hold periods of the receiving flip flop.

A common example of a system with multiple clocks is a communication network where a stream of data bits with an embedded clock arrives at a switch. The data and recovered clock constitute a clock domain which is separate from the clock domain of the switch. The two clock domains are often independent of each other. The input data must cross into the switch clock domain for examination in order to determine its next destination. The data may then have to cross into a third clock domain for transmission out of the switch at a different bit rate to another switch.

Another example of a system with multiple clocks is in large semiconductor chips. Large chips are composed of groups of circuits which are often called modules or cores. Modules send and receive signals from other modules that may be clocked by different clocks from that of the sender. Thus, each module may constitute a separate and independent clock domain. While clocks within a module are typically distributed to the flip flops of the chip with low skew, chip sizes have grown so large that process, voltage, and temperature ("PVT") variations across the chip make low skew clock distribution across the entire chip impossible. Thus, even modules clocked by the same frequency clocks may have unknown phase relationships between the sending and receiving clocks. Signals between such modules must then be viewed as asynchronous signals.

The increasing expectations for reliable system operation, the increasing size of semiconductor chips, the prevalence of multiple clocks, the increasing clock frequencies and the amount of logic all join to make the prevention of metastability in flip flops a basic consideration in semiconductor chip design.

SUMMARY

The invention provides methods and apparatus for preventing metastability in a bistable circuit.

In general, in one aspect, the invention features methods and apparatus implementing techniques for prevention of metastability in a bistable circuit. The techniques include detecting a change in a data signal, sampling the detected change in reference to a sampling window of a clock signal input of a bistable circuit to determine if the detected change occurs within the sampling window, and selecting a stable data input to present to an input of the bistable circuit based on whether the detected change occurs within the sampling window. The sampling window represents a time period during which a change in the data signal can cause metastability in a bistable circuit.

Particular implementations can include one or more of the following features. The technique can include delaying the clock signal to the bistable circuit to match the time of arrival of the data signal at the bistable circuit. The technique can include holding the result of the sampling until a clock transition occurs at the bistable circuit. The technique can also include generating a fixed width pulse in response to detecting a change in the data signal, where sampling the detected change includes sampling the fixed width pulse.

The sampling window can include the setup and hold time of the bistable circuit. The selected stable input can be a delayed copy of the data signal. The delayed copy of the data signal can be delayed by at least an amount equal to the setup and hold time of the bistable circuit. The selected stable input can be an inverted and delayed copy of the data signal. The selected stable input can be outputted from the bistable circuit. The selected stable input can be a static value. The bistable circuit can include a flip flop or a latch.

In general, in another aspect, the invention features a circuit for prevention of metastability in a flip flop. The circuit includes a transition detect circuit configured to detect when a transition has occurred in a data input signal for a bistable circuit, a sample and hold circuit configured to determine if a transition detected in the transition detect circuit occurred in a sampling window representing a time period during which a transition in the data input can cause metastability in the bistable circuit, and a data selection circuit configured to select a stable input for the bistable circuit based on the output of the sample and hold circuit.

Particular implementations can include one or more of the following features. The transition detect circuit can include a first delay element coupled to the data input signal and a two input exclusive OR gate, where a first input of the exclusive OR gate is coupled to the data input signal and a second input is coupled to the output of the first delay element.

The sample and hold circuit can includes a first delay element receiving a clock signal for the bistable circuit as an input, a second delay element receiving the output of the first delay element as an input, a three input AND gate receiving the clock signal as a first input, an inverted output of the second delay as a second input and the output of the transition detection circuit as a third input, and a holding circuit to hold the output of the three input AND gate.

The holding circuit can include a two input OR gate receiving the output of the three input AND gate as a first input and a two input AND gate receiving the output of the first delay element as a first input, where the output of the two input AND gate is provided as a second input to the OR gate and the output of the OR gate is provided as a second input to the two input AND gate. Alternatively, the holding circuit can include a two input OR gate receiving the output of the three input AND gate as a first input and a delayed version of the output of the three input AND gate as a second input.

The data selection circuit can include a multiplexer having two data inputs and a select input, where the multiplexer receives a delayed version of the data signal as a first data input, a stable signal as a second data input, and the output of the sample and hold circuit as the select input, and where the multiplexer selects the first input as an output if the select input is low and the second input as the output if the select input is high. The data selection circuit can further include a delay element providing the first data input, where the delay element is coupled to receive a delayed version of the data input signal as an input. The data selection circuit can also include a delay element providing the second data input, where the delay element coupled to receive a delayed version of the data input signal as an input. The delay element providing the second data input can be configured to delay and invert the received delayed version of the data input signal. The stable input can include a static value. The stable input can include an output of the bistable circuit.

The circuit for prevention of metastability can also include a clock delay circuit to provide a delayed clock signal to the bistable circuit to match the data signal arriving at the bistable circuit.

The invention can be implemented to realize one or more of the following advantages. A metastability prevention circuit ensures input to a bistable circuit, such as a flip flop or latch, is always stable immediately before and after a clock transition. Signals which cross clock domains can be synchronized, such as in network chips which handle multiple bit streams with different bit rates, or processor chips which have skewed clocks across large dice. The metastability prevention circuit of the invention can eliminate one to two cycles of latency, is easy to use and implement and is compatible with available design flows. It can be implemented as a library element by logic designers, allowing an efficient and simple solution to the problem of metastability.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a graph illustrating two stable states connected by a metastable state.

FIG. 2 is illustrates setup and hold windows of an input with respect to a rising clock edge.

FIG. 3 is a block diagram illustrating a high level representation of a circuit to prevent metastability in bistable circuits.

FIG. 4 illustrates an implementation of a circuit preventing metastability in bistable circuits.

FIG. 5 illustrates operation of the transition detector and the sample and hold logic of the circuit of FIG. 4.

FIG. 6 illustrates the operation of the data selection and the bistable circuit.

FIG. 7 illustrates an alternative implementation of a circuit preventing metastability in bistable circuits.

FIG. 8 illustrates the complete sequence of steps when a data change will likely violate the setup and hold stability requirements.

Like reference symbols in the various drawings indicate like elements.

DETAILED DESCRIPTION

A technique to prevent metastability in bistable circuits, such as flip flops or latches, uses a sampling window to detect a transition in an input that occurs at an unsuitable time, such as during setup or hold, and selects an alternate stable data input when such an unsuitably timed transition is detected. The technique includes detecting changes in an input signal and outputting change detected pulses, sampling the change detected pulses at a fixed time, holding the result of the sampling, and selecting a stable input to be presented to the bistable circuit. The technique also includes delaying the clock to the flip flop.

As illustrated in FIG. 3, a metastability prevention circuit includes a transition detect circuit 310, a sample and hold circuit 320, a data selection circuit 330, and a clock delay 340 to prevent metastability in bistable circuit, such as flip flop 350.

Transition detect circuit 310 receives a data input 360 and detects if a transition has occurred in the data input 360. Sample and hold circuit 320 receives the output from the transition detect circuit 310 and a clock signal 370. The sample and hold circuit 320 samples the output of the transition detect circuit 310 using a sampling window based on the clock signal 370, and holds the sampling to transmit to the data selection circuit 330.

The data selection circuit 330 receives the output of the sample and hold circuit 320 and the data input 360. If the output of the sample and hold circuit indicates that a change occurred during the sampling window, the data selection circuit 330 selects a stable input to forward to flip flop 350. Flip flop 350 also receives the output of clock delay circuit 340, which delays the clock signal 370 to match the delay to the data input received by flip flop 350. Output 380 is the output of flip flop 350.

FIG. 4 illustrates an implementation of the block diagram of FIG. 3. Transition detection circuit 310 includes a delay element 411 and an exclusive OR gate 412. Delay 411 receives data input 360 as an input. The output of delay 411 is received by exclusive OR gate 412 along with data input 360. Exclusive OR gate 412 outputs a high signal when its two inputs are not equal, e.g., when data input 360 is high and output of delay 411 is low or when the output of delay 411 is high and data input 360 is low. Thus, when the data input 360 changes, the exclusive OR gate 412 will generate a pulse proportional to the delay of the delay element 411. For a flip flop or a latch, the width of the pulse generated by OR gate 412 can be very small. In some embodiments, the pulse generated by OR gate 412 can include a fixed width pulse to allow the metastability prevention circuit to be used for other types of circuits that are susceptible to metastability, such as registers.

Referring to FIG. 5, the "input" and "input_delay" waveforms represent input signals for exclusive OR gate 412. The "change_detected" waveform represents the output signal of exclusive OR gate 412. The illustration shows only a low to high change but a high to low change will yield the same result.

Referring to FIGS. 4 and 5, the sample and hold circuit 320 is implemented by the three input AND gate 421, the inverter 422, a second delay element 423, a two input OR gate 424, a two input AND gate 425, and a third delay element 426. The second delay element 423 and third delay element 426 delay clock signal 370, and inverter 422 inverts the output of the third delay element 426. The three input AND gate 421 receives the output of inverter 422, clock signal 370 and the output of transition detection circuit 310 (i.e., the output of exclusive OR gate 412) as inputs. Clock signal 370, represented by the "clock" waveform in FIG. 5, and the output of the inverter 422 (i.e., a delayed inverted version of the clock signal 370), represented as the "clock_invert" waveform, define a sampling window. The amount of delay defines the sampling window. When the sampling window overlaps a "Change_Detected" pulse, the AND gate 421 will generate a pulse proportional to the degree of overlap. The output of AND gate 421 is represented by the "Bad_News" waveform. Thus, gate 421 examines whether a change has occurred in the data input during the sampling window.

The two input OR gate 424 and the two input AND gate 425 form a latch circuit to hold the result of the sampling performed by AND gate 421. OR gate 424 receives the output of AND gate 421 as one input, and the output of AND gate 425 as another input. The output of OR gate 424 is fed back as an input to AND gate 425. The AND gate 425 receives the output of second delay element 426 as its other input. The AND gate 425 can alternatively receive clock signal 370 directly. However, this places an additional load on the clock driver.

The latch constituted by AND gate 425 and OR gate 424 holds the output of AND gate 421 until the clock transition at the flip flop 350 has been made. The clock transition at the flip flop 350 stores the flip flop input data in the flip flop. Since the "bad_news" pulse occurs before the clock transition at the flip flop clock input, the "bad_news" pulse must be held.

Referring to FIGS. 4 and 5, the waveform labeled "sample clock" is the output of delay element 426, and the waveform labeled "hold_news" is the output of AND gate 425. The "select alternate" waveform represents the output of OR gate 424.

The output of OR gate 424 is provided to data selection circuit 330, and can be made available as a control output 490. Control output 490 is an optional output which could be used to control the data selection of other multiplexers or be used to monitor the sampling and hold logic.

The data selection circuit 330 selects a stable input for flip flop 350 when the output of the sample and hold circuit 320 (i.e., the output of OR gate 424) indicates that a change has occurred at an inopportune time (i.e., a change has occurred in the sampling window). In the circuit of FIG. 4, two different delayed versions of the data input 360 are used as possible stable inputs for selection by the data selection circuit 330. Even if the data input 360 is changing at an inopportune time, it is likely that the data input 360 will be stable at a later point in time. Thus, a delayed version of the data input 360 can be used as a stable input if the data input 360 is changing at an inopportune time, such as during the setup or hold time of flip flop 350.

The data selection circuit 330 is implemented by the two input Multiplexer 431, a fourth delay element 432, and a fifth delay element 433. Fourth delay element 432 receives a delayed version of data input 360 from delay element 411, and fifth delay element 433 receives the output of fourth delay element 432. The output of fourth delay element 432 corresponds to the delay caused by the transition detect circuit 310 and the sample and hold circuit 320. The output of the fifth delay element allows the multiplexer to use another copy of the data input signal 360 at a later point in time which is not changing. The Multiplexer 431 input labeled "0" is connected to the output of delay element 432. The Multiplexer input labeled "1" is connected to the output of delay element 433. Multiplexer 431 receives the output of sample and hold circuit in its select input port "S".

When the Multiplexer input labeled "S" is low, the signal at the input labeled "0" is selected and made available at the Multiplexer output. When the Multiplexer input labeled "S" is a high, the signal at the input labeled "1" is selected and made available at the Multiplexer output. Thus, multiplexer 431 selects the input labeled "1" when an inopportune changed has occurred in data input 360.

Referring to FIGS. 4 and 6, the waveform labeled Select_Alternate represents the "S" input of multiplexer 431. The waveform labeled "Input_Delay1" represents the input "0" and the waveform labeled "Input_Delay2" represents the input "1" of the multiplexer 431. The waveform labeled "FF_Input" represents the output of the multiplexer 431. Since "Input_Delay2" is just a delayed version of "Input_Delay1," there is no change in the output when the Select_Alternate changes from a low to a high and "Input_Delay2" is selected instead of "Input_Delay1".

If the "Select_Alternate" signal is low, then it means the "Input_Delay1" signal will not have changes during the setup and hold periods surrounding the flip flop clock. If the "Select_Alternate" signal is high, it indicates that the "Input_Delay1" signal is likely to violate the setup and hold requirements and an alternate stable signal should be selected. "Input_Delay2" is the input signal 360 with additional delays compared to "Input_Delay1". An asynchronous signal which needs to be synchronized will often have only one change during a clock cycle. Thus, it is reasonable to assume that selecting another copy of the signal with more delay will insure the signal is stable with respect to the flip flop clock edge.

Another choice for the alternate input signal is an inverted and delayed version of the input signal 360. Other choices may be a static 1, a static 0, the flip flop 350 output, or the inverted flip flop 350 output. For example, if it is known that the data signal 360 is changing a lot, it may be preferable to use a static input for input "1" of the multiplexer 431 instead of a delayed version of the data signal 360. If a static 1 or 0 is used, then the multiplexer 431 may be replaced with an OR gate or NOR gate, depending on system design considerations which are outside of the scope of this invention.

The multiplexer 431 output is connected to the flip flop 350 data input "D". The clock delay circuit 340 is implemented by a sixth delay element 441. The clock input of the flip flop 350 is connected to the output of the delay element 441. The flip flop 350 synchronizes the asynchronous input data 360 to the clock domain of the clock signal 370. The flip flop output 380 is the synchronized version of the asynchronous input 360.

The waveform labeled "FF_Input" is the data input of the flip flop 350, and the waveform labeled "Output" is the output of the flip flop. The waveform labeled "FF_Clock" is the output of delay element 441. The flip flop "Output" changes after the rising edge of "FF_Clock" to reflect the "FF_Input" state prior to the rising clock edge.

The values of the six delay elements 411, 423, 426, 432, 433, 441 will depend on the specific technology used to implement metastability prevention. The setup and hold requirements of the flip flop, the delays through the Multiplexer, AND, OR, Inverter, and exclusive OR gates will all affect the delay values of the six delay lines elements 411, 423, 426, 432, 433, 441. Although some guidelines are provided to assist in setting the delay values, detailed implementation-specific simulation will be needed to establish actual delay values and the guidelines provided are not intended to be complete.

Delay element 411 needs to provide, at a minimum, sufficient delay for the exclusive OR gate 412 to generate a pulse wide enough to be recognized by the following three input AND gate 421. Delay element 432 needs to provide sufficient delay to match the total delays of the exclusive OR gate 412, three input AND gate 421, and two input OR gate 424. The delay from the data signal 360 to the multiplexer 431 "S" input needs to be approximately the same as the delay from the data signal 360 to the multiplexer 431 "0" input.

Delay element 433 needs to provide, at a minimum, sufficient delay to equal the setup plus the hold time of the flip flop 350. This will ensure that any changes in the data signal 360 which caused the selection of an alternate signal will be displaced by the delay amount.

Delay element 426 is primarily a buffer to reduce the loading on the Clock signal so the delay amount is not critical. However, in combination with delay element 423 and inverter 422, delay element 426 defines the trailing edge of the sampling window. The sampling window must be wide enough to allow the three input AND gate 421 to generate a pulse wide enough to propagate through the OR gate 424 and the two input AND gate 425 when the exclusive OR gate 412 generates a "Change_Detected" pulse which is coincident.

Delay element 441 must generate sufficient delay to allow an alternate data selection to be made and the flip flop 350 input to be stable before the clock edge arrives.

The circuit illustrated in FIG. 4 can also be implemented in other forms which are functionally equivalent. For example, the circuit can be implemented as:

Select_Alternate=Bad_News|(Select_Alternate & Clock_Delay)

or

~Select_Alternate=~Bad_News & (~Select_Alternate|~Clock_Delay)

where "~" is the inversion operator, "|"is the OR operator, and "&" is the AND operator. Thus, the inverted version of "Select_Alternate" can be generated using a two input OR gate and a two input AND gate. The inverted version of "Bad_News" may be generated using a three input NAND gate.

FIG. 7 shows an alternate circuit for holding the result of the sampling until the flip flop 350 has been clocked. In this circuit, the delay gate 725 needs to provide sufficient delay until the clock edge has arrived at the flip flop. Using this circuit obviates the need for delay element 426. FIG. 7 also shows how delay elements 723 and 741 may have inverted outputs which removes the need for the inverter 422. FIG. 7 also shows the inverted output Qn of flip flop output 380.

In some configurations, the delay to multiplexer 431 "1" input must be less than the delay to the multiplexer 431 "0" input. Thus, delay elements 732 and 733 can be in parallel instead of in series. The parallel arrangement of delay elements 732 and 733 allows the delays introduced by delay element 732 and delay element 733 to be independent of each other. Thus, each of delay element 732 and delay element 733 can be more or less than the other. Delay element 733 can also generate an inverted copy of the data as the input to the multiplexer. The inverted copy of the data is essentially what the data is changing to. So, a look-ahead function is achieved by providing the anticipated value of the data as the value to be stored in the flip flop 350.

FIG. 8 shows the complete sequence of steps when an "Input Data" change will likely violate the setup and hold requirements. The "Input" and "Input_Delay" signals combine to generate the "Change_Detected" pulse. The "Clock" and "Clock_Invert" signals overlap the "Change_Detected" pulse to generate the "Bad_News" pulse. The "Bad_News" pulse goes through the two input OR gate 424 to cause the "Select_Alternate" signal to go high. The "Select_Alternate" signal combines with the "Sample_Clock" signal to cause the "Hold_News" signal to go high and stay high until the "Sample_Clock" signal goes low. "Input_Delay1" and "Input_Delay2" are delayed versions of the "Input" signal. The "Select_Alternate" signal selects the "Input_Delay2" signal for the output of the multiplexer 431, which is labeled "FF_Input." The "FF_Input" is clocked by the "FF_Clock" signal to result in the "Output" signal going low. Thus, it can be seen that an "Input" signal which is changing too close to the "Clock" signal is prevented from inducing metastability in the flip flop 350.

A number of embodiments of the invention have been described. Nevertheless, it will be understood that various modifications may be made without departing from the spirit and scope of the invention. For example, although a flip flop is shown as the bistable circuit, a similar metastability prevention circuit can be used for a latch. Although the latch is level sensitive device instead of an edge sensitive device like the flip flop, the same or similar components can be used with adjustments to the delay elements. Also the use of gates can be varied, such as, for example, an OR gate can be replaced with a NOR gate. Accordingly, other embodiments are within the scope of the following claims.

What is claimed is:

1. A method for prevention of metastability in a bistable circuit comprising:

detecting a change in a data signal;

sampling the detected change in reference to a sampling window of a clock signal input of a bistable circuit to determine if the detected change occurs within the sampling window, the sampling window representing a time period during which a change in the data signal can cause metastability in a bistable circuit; and selecting a stable data input from a plurality of inputs to present to an input of the bistable circuit based on whether the detected change occurs within the sampling window.

2. The method of claim 1, further comprising:
   delaying the clock signal to the bistable circuit to match the time of arrival of the data signal at the bistable circuit.

3. The method of claim 1, further comprising:
   holding the result of the sampling until a clock transition occurs at the bistable circuit.

4. The method of claim 1, wherein the sampling window includes the setup and hold time of the bistable circuit.

5. The method of claim 1, wherein the selected stable input is a delayed copy of the data signal.

6. The method of claim 5, wherein the delayed copy of the data signal is delayed by at least an amount equal to the setup and hold time of the bistable circuit.

7. The method of claim 1, wherein the selected stable input is an inverted and delayed copy of the data signal.

8. The method of claim 1, wherein the selected stable input is outputted from the bistable circuit.

9. The method of claim 1, wherein the selected stable input is a static value.

10. The method of claim 1, further comprising:
    generating a fixed width pulse in response to detecting a change in the data signal, wherein sampling the detected change includes sampling the fixed width pulse.

11. The method of claim 1, wherein the bistable circuit includes a flip flop.

12. The method of claim 1, wherein the bistable circuit includes a latch.

13. A circuit comprising:
    a transition detect circuit configured to detect when a transition has occurred in a data input signal for a bistable circuit;
    a sample and hold circuit configured to determine if a transition detected in the transition detect circuit occurred in a sampling window in an associated clock signal representing a time period during which a transition in the data input can cause metastability in the bistable circuit; and
    a data selection circuit configured to select a stable input from a plurality of inputs for the bistable circuit based on the output of the sample and hold circuit.

14. The circuit of claim 13, wherein the transition detect circuit includes:
    a first delay element coupled to the data input signal; and
    a two input exclusive OR gate, a first input of the exclusive OR gate being coupled to the data input signal and a second input being coupled to the output of the first delay element.

15. A circuit for prevention of metastability in a bistable circuit comprising:
    a transition detect circuit configured to detect when a transition has occurred in a data input signal for a bistable circuit;
    a sample and hold circuit configured to determine if a transition detected in the transition detect circuit occurred in a sampling window representing a time period during which a transition in the data input can cause metastability in the bistable circuit; and
    a data selection circuit configured to select a stable input for the bistable circuit based on the output of the sample and hold circuit, wherein the sample and hold circuit includes
    a first delay element receiving a clock signal for the bistable circuit as an input;
    a second delay element receiving the output of the first delay element as an input;
    a three input AND gate receiving the clock signal as a first input, an inverted output of the second delay as a second input and the output of the transition detection circuit as a third input; and
    a holding circuit to hold the output of the three input AND gate.

16. The circuit of claim 15, wherein the holding circuit includes:
    a two input OR gate receiving the output of the three input AND gate as a first input; and
    a two input AND gate receiving the output of the first delay element as a first input,
    wherein the output of the two input AND gate is provided as a second input to the OR gate and the output of the OR gate is provided as a second input to the two input AND gate.

17. The circuit of claim 15, wherein the holding circuit includes:
    a two input OR gate receiving the output of the three input AND gate as a first input and a delayed version of the output of the three input AND gate as a second input.

18. A circuit for prevention of metastability in a bistable circuit comprising:
    a transition detect circuit configured to detect when a transition has occurred in a data input signal for a bistable circuit;
    a sample and hold circuit configured to determine if a transition detected in the transition detect circuit occurred in a sampling window representing a time period during which a transition in the data input can cause metastability in the bistable circuit; and
    a data selection circuit configured to select a stable input for the bistable circuit based on the output of the sample and hold circuit, wherein the data selection circuit includes
    a multiplexer having two data inputs and a select input, the multiplexer receiving a delayed version of the data signal as a first data input, a stable signal as a second data input and the output of the sample and hold circuit as the select input, wherein the multiplexer selects the first input as an output if the select input is low and the second input as the output if the select input is high.

19. The circuit of claim 18, wherein the data selection circuit further includes a delay element providing the first data input, the delay element coupled to receive a delayed version of the data input signal as an input.

20. The circuit of claim 18, wherein the data selection circuit further includes a delay element providing the second data input, the delay element coupled to receive a delayed version of the data input signal as an input.

21. The circuit of claim 20, wherein the delay element providing the second data input is configured to delay and invert the received delayed version of the data input signal.

22. The circuit of claim 18, wherein the stable input includes a static value.

23. The circuit of claim 18, wherein the stable input includes an output of the bistable circuit.

24. The circuit of claim 13, further comprising:
    a clock delay circuit to provide a delayed clock signal to the bistable circuit to match the data signal arriving at the bistable circuit.

* * * * *